Sept. 8, 1942.   C. C. LONG   2,295,226
CONDENSATION OF METALLIC VAPORS
Filed April 29, 1940
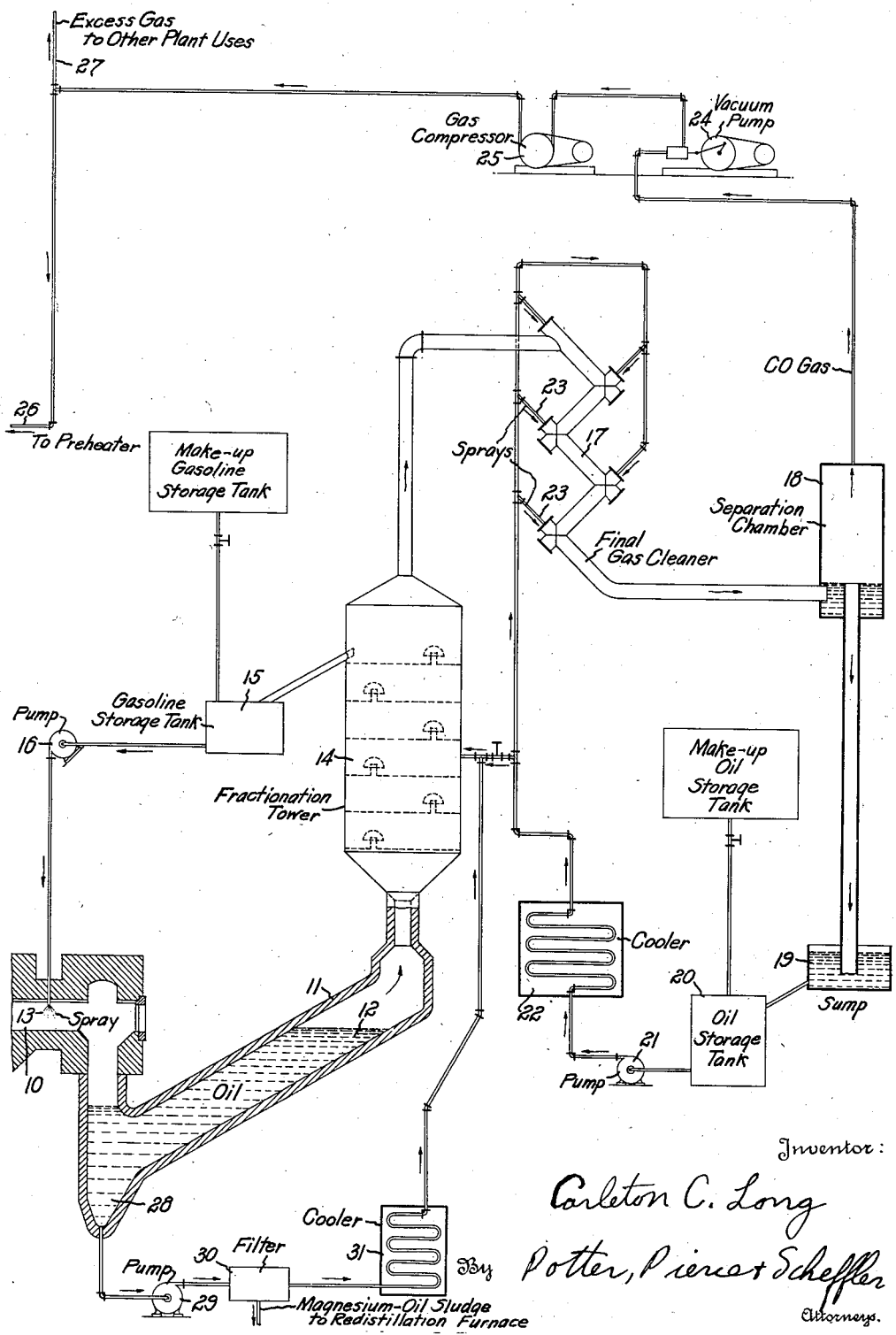

Patented Sept. 8, 1942

2,295,226

UNITED STATES PATENT OFFICE 2,295,226

CONDENSATION OF METALLIC VAPORS

Carleton C. Long, Beaver, Pa., assignor to St. Joseph Lead Company, New York, N. Y., a corporation of New York Application April 29, 1940, Serial No. 332,359

7 Claims. (Cl. 75—67)

This invention relates to the condensation of metallic vapors.

The invention has for its principal object the provision of a method of continuously condensing, in large quantities, metal vapors from a mixture of metal vapors and permanent or non-condensible gases.

A characteristic feature of the invention is the provision of means to effect this condensation in such a manner that reaction of the metallic vapors with the accompanying permanent or non-condensible gases is substantially avoided. This feature is of vital importance when condensing vapors from reaction systems in which the products of reaction may undergo a reverse reaction upon lowering the temperature.

An outstanding example of this type of system is the thermic reduction of magnesium oxide by carbon to form magnesium metal vapor and carbon monoxide, $$MgO + C = Mg + CO$$

This reaction proceeds to the right with increase in temperature, and, at a temperature of about 1800° C., at one atmosphere total pressure, the reaction is substantially complete. If the temperature is allowed to fall, the reaction tends to reverse to the left.

From a practical viewpoint, this means that a mixture of Mg and CO, evolved from a reaction zone at suitable temperature, will, if the temperature is lowered, react with each other to form MgO and carbon soot. In order to condense any of the magnesium vapor, however, the temperature must be reduced at least below the dew point temperature of magnesium vapor in the system considered. To condense substantial amounts of magnesium vapor the exit temperature of the condenser should be not higher than 750–800° C.

Reaction velocities, in general, increase with increases in temperature. Conversely, if a hot mixture of carbon monoxide and magnesium vapor is abruptly chilled, the reaction velocity rapidly is reduced to an infinitesimally slow rate so that there is little opportunity for any substantial portion of the magnesium vapor to be oxidized.

Various means for securing this abrupt temperature drop have been proposed. In one system, undercooled hydrogen gas is mingled in large volumes with the mixture of carbon monoxide and magnesium vapor issuing from the reaction zone. Another suggestion has been to impinge the hot vapor-gas mixture on a film of oil formed on a water-cooled sheet or drum. Another suggestion envisages passing the hot vapor-gas mixture through a tower packed with lumps of a fusible material, the latent heat of melting of which will abstract heat from the vapor-gas stream.

The present invention discloses a method of securing the necessary abrupt temperature drop simply and effectively and at the same time offers a method for handling large volumes of gases and vapors on a commercial scale.

Briefly, the method comprises bubbling the gas-vapor mixture through a suitably enclosed liquid condensing medium.

In U. S. Patent 2,070,101 issued to Weaton and Najarian, an internal type condenser is described in which metallic vapors such as zinc or the like are drawn through a bath of molten metal by an appropriate suction producing device. In practical operation a condenser of this type filled with molten zinc recovers 20 tons or more of zinc a day from a mixture of carbon monoxide gas and zinc vapor formed by the reduction of zinc oxide materials by carbon in an electric resistance furnace. The operating temperature of the zinc bath is normally of the order of 550° C.

Upon attempting to apply this technique to the recovery of magnesium from a mixture of carbon monoxide and magnesium vapor, a difficulty is encountered, in that, to keep the bath from freezing, a higher temperature must be maintained. Magnesium melts at approximately 651° C., and to provide a margin of safety, the actual temperature of the liquid magnesium metal bath must be carried somewhat higher than the melting point. At these temperatures the reaction rate between carbon monoxide and magnesium may not be entirely disregarded, and a certain degree of reversion to magnesium oxide is to be expected.

The present invention, in place of employing a molten metal bath of the same metal as that whose vapor is being condensed, provides a condensing medium differing in composition from the metallic vapors to be condensed. The characteristics of the condensing medium provided are such that the bath temperature may be carried at a level sufficiently low to substantially avoid any reaction reversal or re-oxidation. By this means I retain all the benefits of the internal type condenser of Weaton and Najarian, such as ease of handling large amounts of vapors and gases in a continuous manner, but avoid the difficulties that arise when an attempt is made to condense vapors from a reversible system at temperatures high enough to permit re-oxidation.

For the practice of this invention several types of suitable condensing bath compositions are available. In general, these fall into three principal categories: (a) a molten metal other than that of which the vapors are to be condensed; (b) a fused salt bath, such as a flux bath, which is inert to the condensed metal and the permanent gases, but which may have the property of uniting with and removing residual amounts of metallic oxides. (c) an entirely inert fluid, such as a hydrocarbon oil, or a mixture of hydrocarbons to give a fluid bath of suitable composition.

Under type a for the condensation of magnesium vapor from a mixture of magnesium vapor and carbon monoxide, one suitable condensing composition that may be employed is molten lead. Lead possesses a particularly long fluid range, measured on a temperature scale. Although lead melts at 327° C., the boiling point, under normal pressure, is over 1600° C.

Unlike zinc, lead does not react with iron or steel or their alloys. This helpful fact permits a considerable modification of condenser construction and practice, as temperature control is not hampered by interposed refractories, and, also, a force feed circulating system may be advantageously employed, by means of which the condensing medium may be circulated through an external cooler and through a separating chamber where the solid magnesium powder and magnesium-lead alloy may be separated from the condensing liquid.

In condensation experiments using lead as the condensing agent, I find that formation of magnesium-lead alloy occurs and that this may, in certain circumstances, be a disadvantage. Therefore, methods b and c, described below, are of more general application. However, when the lead-magnesium alloy itself is the desired final product, the use of molten lead as the condensing agent is advantageous. Lead-magnesium alloys are finding use in loading shotgun shells for bird shooting, wherein, if wounds are not fatal, the pellets soon disintegrate in the body fluids. Lead-magnesium alloys also find some use as deoxidizing agents in steel manufacture. The addition of lead to steel tends to better the machining properties.

Under type b may be employed, for example, readily fusible mixtures of magnesium, potassium and sodium chlorides. A mixture of 60% MgCl₂, 30% NaCl, and 10% KCl has been found to be suitable. This mixture melts and becomes fluid at about 450° C.

Particular advantages of fluid flux baths are that the condensed magnesium particles are surrounded by a film of flux which protects them from oxidation, and that any oxide formed or carried over into the condenser is dissolved by the flux bath.

Powdered or finely ground solid salt mixture may be injected into the gas-vapor stream immediately ahead of the liquid flux bath to take up some of the heat by melting the flux particles and also to serve as condensation nuclei for the condensing vapor.

Other salt mixtures than the example mentioned above may be employed. Desirable properties of a salt bath for condensing purposes are (1) low melting point, (2) inertness toward vapor being condensed, (3) low vapor pressure, (4) chemical and physical stability, (5) fluxing action, i. e., ability to dissolve and remove oxides and other non-metallic impurities, and (6) ability to remain freely fluid even after having taken up substantial quantities of oxides or other impurities.

In general, I find that liquid salt fluxes may be handled in ferrous alloy containers (condenser shells) providing oxygen is substantially absent. In a magnesium condenser free oxygen obviously cannot be present. Refractory condenser shells in general are rapidly attacked by fluid flux baths. An outstanding exception appears to be the silicon carbide refractory sold commercially under the trade-name "Carbofrax."

Under type c cheap hydrocarbons such as kerosene or slightly heavier petroleum distillate fractions may be employed. Steel or steel alloy containers for the condensing liquid may advantageously be employed. A portion of the condensing fluid may be diverted through a settling chamber, thickener, or filter, and the clarified overflow returned to the condenser. The use of oil as a condensing medium covers each condensed metallic particle with a protective film which inhibits oxidation.

The necessary abrupt chilling, mentioned above, may be secured in a particularly advantageous manner, when a type c condenser fluid is used, by injecting large quantities of the hydrocarbon oil, or one of the lower boiling point constituents, if a mixture of hydrocarbons is employed, into the gas-vapor stream between the furnace exit and the condensing fluid bath. The heat of evaporation of the injected liquid is derived from the temperature drop of the gas-vapor mixture and from the heat evolved by condensing metallic vapor. The vaporized hydrocarbon is again returned to the liquid state in the condenser or in a subsequent gas cleaning train or fractionation column.

This method of shock-cooling possesses marked and substantial advantages over the older art method of injecting large volumes of undercooled hydrogen gas. Particularly is this true with the internal type condenser, for, with an increase in volume of non-condensible gases, the fluid loss from vapor pressure effects increases in proportion, whereas if the shock-chilling agent is a condensible vapor, such as gasoline, kerosene, and the like, the volume of non-condensible gas leaving the condenser is restricted to the carbon monoxide entering with the metal vapor from the furnace. This latter volume is of the order of only one-hundredth of the non-condensible gas volume that must be handled when hydrogen, or other inert permanent gas, is employed for shock-chilling. The total amount of heat, sensible and latent, that must be removed when cooling a vapor-gas mixture of 40% Mg and 60% CO from 2000° C. to 100° C. is approximately 6500 B. t. u. per pound of magnesium.

Yet another advantage of employing a readily vaporizable portion of the condensing liquid bath to secure shock-chilling is that the problem of separating the shock-chilling agent from the carbon monoxide is eliminated, inasmuch as this separation occurs naturally as a part of the operation of the condenser and its accessories. In the older art methods, separation of hydrogen from carbon monoxide so that the hydrogen might be re-used was in itself a problem of no mean technical difficulty which profoundly affected the overall economy of the process.

In a preferred apparatus embodiment of this invention, which includes means for injecting a shock-chilling agent (preferably a low boiling hydrocarbon), an internal condenser of the Weaton-Najarian type, and means for circulating the condensing fluid (preferably a mixture of hydrocarbon liquids) through the condenser and associated cooling, settling, and separating apparatus, the condensed metal will emerge as a sludge. This sludge is then redistilled, in known manner, to yield coherent metal of high purity.

The internal type condenser contemplated by this specification, employing a condensing liquid of composition differing from that of the metallic vapor to be condensed, may be applied to any gas-vapor mixture, whether its origin be an arc furnace, a muffle, a retort, or other source. However, this condenser is particularly applicable to the gas-vapor mixture supplied by an electrothermic furnace of the type wherein the charge itself serves as the resistor, and the heat is generated in the charge itself. Furnaces of this type in conjunction with the aforementioned Weaton-Najarian type internal condensers have given outstanding results in the production of zinc metal.

The accompanying drawing illustrates one form of the present invention as applied to the condensation of magnesium from a mixture of magnesium vapor and carbon monoxide such as is evolved, for example, by passing an electric current through a charge consisting of an intimate mixture of magnesia and carbon in an electric furnace whereby the temperature of the charge is raised to that required for smelting, that is, about 2000° C. The mixture of carbon monoxide gas and magnesium metal vapor evolved in the furnace is withdrawn by suction from the vapor outlet 10 of the furnace into the internal type condenser 11 where abrupt cooling, with consequent condensation, is accomplished by bubbling through the body of condensing liquid 12. Rapidity of cooling is further enhanced by a spray or sprays 13 of inert, volatilizable liquid, for example, gasoline, introduced in the short connecting space between the vapor ring and the condensing fluid. These sprays are preferably positioned in such a manner that any non-volatilized liquid serves to wash down the walls of the connecting chamber, thus avoiding accretions or eventual plugups.

The non-condensible gases (carbon monoxide) are drawn through the condensing liquid and into the fractionation column 14. The condenser temperature is maintained sufficiently high to boil off substantially all of the lower boiling hydrocarbon together with a portion of the higher boiling hydrocarbon. In the fractionation column 14 a separation of the two components occurs with the higher boiling oil flowing back into the condenser and the lower boiling gasoline coming off the upper portion of the column and flowing to a surge tank 15 from which, by a suitable pump 16, the low boiling inert liquid is returned to the connecting conduit sprays 13.

Effluent gas from the top of the fractionation column 14 contains, in vapor form, an appreciable amount of low boiling inert liquid—gasoline in the example being discussed. This vapor is removed, together with any particles of solid material, by passage of the gas through the gas cleaner 17 where thorough scrubbing by cold, high boiling point liquid (oil) occurs. In the separator chamber 18 the gasoline-oil mixture overflows down barometric leg and seal 19 to storage tank 20. By pump 21 the oil is returned through cooler 22 in part to the eductor sprays 23 and in part into the fractionation column 14. The proportion so diverted to the fractionation column is adjusted to balance out approximately the amount of gasoline picked up by the oil in the gas cleaner 17. Generally, it is not required to strip all of the low-boiling vapors from the carbon monoxide gas, inasmuch as the heating value of the gas is enhanced by any hydrocarbon gases added to it. An addition of this sort may occur from "cracking" of oil in the connecting box and condenser entrance.

From separator chamber 18 the gases flow to vacuum pump 24 and to gas compressor 25. The compressed gases may then be supplied through pipe 26 for preheating the furnace charge and through pipe 27 for other uses about the plant.

The condensed metal collects as a sludge in the condenser trap 28 from which it is withdrawn by pump 29 and pumped through the filter 30. The separated liquid condensation medium from the filter passes through cooler 31. From the cooler 31 the clarified oil is introduced into the fractionation column 14 where the aforementioned separation of high and low boiling inert liquids takes place.

Magnesium-oil sludge from the filter may be pressed and briquetted to eliminate excess liquid, and then distilled to obtain coherent metal of high purity. When oil-covered the magnesium metal powder is protected from oxidation and is relatively free from fire danger.

If desired, most of the oil may be removed from the mixture by a low temperature distillation from which the oil may be recovered for re-use in the condenser system.

The example and arrangement described above represents only one of a number of workable variations coming within the scope of the present invention. It is not necessary, if type of condensing liquid is to be used, to employ a mixture of low and high boiling point hydrocarbon liquids, nor is the separation system necessary. These are refinements, having the advantages brought out in the above description. The sprays in the connecting box may, in an alternative arrangement, be dispensed with. Other alternative methods of circulating and tapping the condenser fluid are obvious to those skilled in the art and are within the scope of the invention.

In its method aspect, the invention broadly comprises the condensation of metallic vapors, particularly magnesium, from a mixture of the metallic vapor and a non-condensible gas, by passing the mixture into a body of liquid substance inert to said metal at the temperature of condensation and liquid through a range of temperature from substantially below the melting point of the metal to be condensed to substantially above the melting point of the metal to be condensed, and maintaining the liquid substance at a temperature at which there is no substantial reaction between the metal to be condensed and the non-condensible gas, preferably below the melting point of the metal to be condensed.

By causing the mixture of metallic vapor and gas to bubble through a confined body of a suitable liquid substance, which because of its large mass relative to the mass of metallic vapor in contact therewith and the vigorous and thorough agitation resulting from this method of operation provides a very large heat absorptive capacity in intimate contact with the condensing vapors, the temperature of the metallic vapors upon contacting the body of liquid falls at an extremely rapid rate to the substantially constant temperature level of the body of liquid. In this manner, all of the metallic vapor is uniformly cooled through the critical temperature zone in a very short period of time.

I claim:

1. A method of condensing magnesium from a mixture containing magnesium vapor and carbon monoxide which comprises passing the mixture into a body of hydrocarbon material inert to magnesium at the temperature of condensation and liquid through a range of temperature from substantially below the melting point of magnesium to substantially above the melting point of magnesium, said hydrocarbon material including at least a portion of material which is volatile under the conditions of condensation, and maintaining the hydrocarbon material at a temperature at which there is no substantial reaction between the magnesium and the carbon monoxide by the volatilization of a portion of the hydrocarbon material from said body.

2. A method of condensing metallic vapors from a mixture of the metallic vapor and a non-condensible gas which comprises passing the mixture into a body of liquid substance inert to said metal at the temperature of condensation and liquid through a range of temperature from substantially below the melting point of the metal to be condensed to substantially above the melting point of the metal to be condensed and maintaining the liquid substance at a temperature at which there is no substantial reaction between the metal to be condensed and the non-condensible gas by the volatilization of a portion of the liquid substance from said body thereof.

3. A method of condensing magnesium from a mixture containing magnesium vapor and carbon monoxide which comprises passing the mixture into a body of liquid substance inert to magnesium at the temperature of condensation and liquid through a range of temperature from substantially below the melting point of magnesium to substantially above the melting point of magnesium and maintaining the liquid substance at a temperature at which there is no substantial reaction between the magnesium and the carbon monoxide by the volatilization of a portion of the liquid substance from said body thereof.

4. A method of condensing magnesium from a mixture containing magnesium vapor and carbon monoxide which comprises passing the mixture into a body of hydrocarbon material inert to magnesium at the temperature of condensation and liquid through a range of temperature from substantially below the melting point of magnesium to substantially above the melting point of magnesium, said hydrocarbon material including at least a portion of material which is volatile under the conditions of condensation, maintaining the hydrocarbon material at a temperature at which there is no substantial reaction between the magnesium and the carbon monoxide by the volatilization of a portion of the hydrocarbon material from said body, condensing the volatilized hydrocarbon material and returning the condensed material to said body.

5. A method of condensing magnesium from a mixture containing magnesium and carbon monoxide which comprises introducing into said mixture a finely divided stream of liquid substance inert to magnesium and volatile at the temperature of said mixture and thereafter passing the mixture into a body of liquid substance inert to magnesium at the temperature of condensation and liquid through a range of temperature from substantially below the melting point of magnesium to substantially above the melting point of magnesium, and maintaining the liquid substance at a temperature at which there is no substantial reaction between the magnesium and the carbon monoxide by the volatilization of a portion of the liquid substance from said body thereof.

6. A method of condensing magnesium from a mixture containing magnesium and carbon monoxide which comprises introducing into said mixture a finely divided stream of liquid substance inert to magnesium and volatile at the temperature of said mixture and thereafter passing the mixture into a body of liquid substance inert to magnesium at the temperature of condensation and liquid through a range of temperature from substantially below the melting point of magnesium to substantially above the melting point of magnesium, maintaining the liquid substance at a temperature at which there is no substantial reaction between the magnesium and the carbon monoxide by the volatilization of a portion of the liquid substance from said body thereof, condensing the volatilized material and returning at least a portion of the condensed material to said finely divided stream.

7. A method of condensing magnesium from a mixture containing magnesium and carbon monoxide which comprises introducing into said mixture a finely divided stream of liquid hydrocarbon inert to magnesium and volatile at the temperature of said mixture and thereafter passing the mixture into a body of liquid hydrocarbon inert to magnesium at the temperature of condensation and liquid through a range of temperature from substantially below the melting point of magnesium to substantially above the melting point of magnesium, and maintaining the liquid hydrocarbon at a temperature at which there is no substantial reaction between the magnesium and the carbon monoxide by the volatilization of a portion of the liquid hydrocarbon from said body thereof.

CARLETON C. LONG.